United States Patent
Bruwer et al.

(10) Patent No.: US 10,019,590 B2
(45) Date of Patent: Jul. 10, 2018

(54) SECURE MOBILE PHONE DOCUMENT STORAGE APPLICATION

(71) Applicant: AZOTEQ (PTY) LTD, Paarl (ZA)

(72) Inventors: Frederick Johannes Bruwer, Paarl (ZA); Jacobus Daniel Van Wyk, Paarl (ZA)

(73) Assignee: AZOTEQ (PTY) LTD, Paarl (ZA)

( * ) Notice: Subject to any disclaimer, the term of this patent is extended or adjusted under 35 U.S.C. 154(b) by 197 days.

(21) Appl. No.: 14/861,151

(22) Filed: Sep. 22, 2015

(65) Prior Publication Data
US 2016/0085981 A1 Mar. 24, 2016

(30) Foreign Application Priority Data

Sep. 22, 2014 (ZA) .................................. 201406905

(51) Int. Cl.
| | | |
|---|---|---|
| *G06F 21/62* | (2013.01) | |
| *H04L 29/06* | (2006.01) | |
| *H04W 12/06* | (2009.01) | |
| *H04W 12/02* | (2009.01) | |
| *H04W 88/02* | (2009.01) | |

(52) U.S. Cl.
CPC ...... *G06F 21/6209* (2013.01); *G06F 21/6218* (2013.01); *H04L 63/083* (2013.01); *H04W 12/06* (2013.01); *H04W 12/02* (2013.01); *H04W 88/02* (2013.01)

(58) Field of Classification Search
CPC ............. G06F 21/6209; G06F 21/6218; H04L 63/083; H04W 12/06; H04W 12/02; H04W 88/02
See application file for complete search history.

(56) References Cited

U.S. PATENT DOCUMENTS

| | | | |
|---|---|---|---|
| 6,011,849 A | 1/2000 | Orrin | |
| 7,036,020 B2 * | 4/2006 | Thibadeau | G06F 21/805 |
| | | | 713/189 |
| 7,584,198 B2 | 9/2009 | Slade | |
| 8,359,659 B2 * | 1/2013 | Sim | G06F 21/6245 |
| | | | 713/166 |
| 8,483,426 B2 | 7/2013 | Rhoads et al. | |
| 2003/0208686 A1 * | 11/2003 | Thummalapally | H04L 63/0442 |
| | | | 713/193 |
| 2004/0267600 A1 * | 12/2004 | Horvitz | G06F 17/30873 |
| | | | 705/7.31 |

(Continued)

OTHER PUBLICATIONS

Anderson, R. et al., "The Steganographic File System"; Information Hiding—Second International Workshop, IH '98 Dortland, Oregon, USA, Apr. 14 -17 1998, Proceedings pp. 72-83, ISBN 978-3-540-65386-8 (Print), ISBN 978-3-540-49380-8 (Online).

(Continued)

*Primary Examiner* — Saleh Najjar
*Assistant Examiner* — Louis C Teng
(74) *Attorney, Agent, or Firm* — Mattingly & Malur, PC

(57) ABSTRACT

A method for a smart phone app is provided wherein entry to a secure data storage area is facilitated on a file or object level, and not on an app level, wherein the secure data storage area is hidden from the normal application display or view. To obtain an interface which allows entry into the secure data storage area, a user may perform one or other input action, gesture or other step, wherein these are linked with a specific file or object.

8 Claims, 4 Drawing Sheets

(56) References Cited

U.S. PATENT DOCUMENTS

| | | | |
|---|---|---|---|
| 2011/0199628 A1* | 8/2011 | Tohki | H04N 1/0035 |
| | | | 358/1.13 |
| 2013/0159932 A1* | 6/2013 | Chen | G06F 3/0482 |
| | | | 715/835 |
| 2014/0047236 A1* | 2/2014 | Russell | G06F 21/6218 |
| | | | 713/168 |
| 2015/0302218 A1* | 10/2015 | Fielder | G06F 19/322 |
| | | | 713/193 |
| 2016/0188205 A1* | 6/2016 | Rao | H04L 63/08 |
| | | | 715/773 |
| 2016/0196419 A1* | 7/2016 | Kuscher | G06F 21/36 |
| | | | 715/741 |
| 2016/0196435 A1* | 7/2016 | Oh | H04W 4/21 |
| | | | 713/193 |
| 2016/0300079 A1* | 10/2016 | Gong | G06F 21/6218 |

OTHER PUBLICATIONS

Bucerzan, D. et al., "SmartSteg: A new Android Based Steganography Application"; International Journal of Computers, Communication and Control, Oct. 2013, pp. 681-688.

\* cited by examiner

SECURE MOBILE PHONE DOCUMENT STORAGE APPLICATION

BACKGROUND OF THE INVENTION

As mobile phones increasingly fulfil roles traditionally occupied by other electronic devices, the amount of sensitive data being stored on them has increased accordingly. A potential data security risk is exacerbated by the very mobility causing the exponential development and prevalence of mobile or smart phones. The chances of a smart phone being lost or stolen are fairly high, creating a need for increased security for these devices.

One method which can be used to increase security is so-called "security through obscurity", or in other words, hiding something in plain sight. The discipline of steganography is often used to implement such hiding. For personal computers, the prior art contains a number of teachings to this effect. Two notable disclosures are found in "The Steganographic File System", a paper by Anderson, Needham and Shamir (at the $2^{nd}$ International Workshop on Information Hiding, IH'98, Portland, Oreg., USA, Apr. 15-17 1998, Proc. LNCS 1525, Springer-Verlag, ISBN 3-540-653864, pp. 73-82), and in U.S. Pat. No. 7,584,198 by Slade. Both these disclosures deal with the use of blocks of random data, and using a file system where data to be secured is stored within these blocks in a manner which is not easily detectable. Slade also teaches that a passphrase, used to protect access to the data, may be used for encryption and decryption. However, implementations of steganography as taught by Anderson et al and Slade are presently not used by state of the art smart phones to securely store data, possibly due to their inherent waste of data storage space and their complexity.

Applications, or apps, for the smart phones that allow users to store a picture within another picture, or text within an audio file, making use of steganographic techniques and data redundancy, are available in the prior art. For example, reducing the colour resolution of a picture while keeping the file size constant frees up a section of data space which can be used to hide data in. If the reduction in colour resolution is not easily noticeable, the picture will ostensibly be just a picture, with only the user of the app knowing that some other data is stored securely within it. Another common technique is to reduce the sound quality of an audio file slightly and to utilize the freed-up data space as a secure store. However, such apps are limited by the amount of data that can be practically stored, and are cumbersome to use on a regular basis to store sensitive information.

The prior art also contains a number of smart phone apps with secure data stores, but which are presented as another app at first glance. For example, an app named "Hide It Pro" exists which hides a secure data storage area behind a fully functional audio player. Another, "Video Locker", hides its data storage behind a fully functional calculator. With these applications, a user typically has to perform the one or other specific input action to obtain an interface where a Personal Identification Number (PIN) or password (aka passphrase) is used to enter the secure data storage area. There are also a large number of prior art smart phone apps which offer secure data storage behind a PIN or password, without hiding the application. A number of these have a decoy password facility, where entering the decoy password results in the user being presented with a fake secure data storage area. This is useful if a smart phone owner is coerced or forced to enter his or her password, with the aim to illegally obtain securely stored sensitive information.

However the aforementioned prior art apps suffer from some disadvantages. Firstly, if not hidden, the mere existence of the apps provide unauthorised users such as hackers or criminals with motivation to search more thoroughly for hidden, sensitive information. But even if they are hidden, due to the limited number of these apps available, it is foreseeable that unauthorised users may be able to easily identify them. Secondly, having the whole secure data storage area behind one PIN or password, or even a number of sequential passwords, creates an unnecessary security risk. Once the password, or passwords, is obtained, by whatever means, the security of all the data/files stored in the secure data storage area is compromised. Thirdly, users typically have to open or use the specific secure data storage application to store sensitive data. This may prove cumbersome. For instance when a user is viewing a .pdf document received via email, and decides to store it securely, he or she first has to open said secure data storage app to do this. Fourthly, a large number of the prior art secure data storage apps offer the possibility for abuse, where data may be stored without consent which may be required or advisable. For example, prior art secure data storage apps may be used by under aged users to hide data without parental consent. Or employees may use their smart phones to hide sensitive data from employers, without consent, possibly for criminal purposes.

The present invention discloses methods to address these disadvantages.

SUMMARY OF THE INVENTION

In a first embodiment, the present invention is a method for a smart phone app wherein entry to a secure data storage area is facilitated on a file or object level, and not on an app level, as is done with prior art apps, and wherein the secure data storage area is hidden from the normal application display or view. That is, to obtain an interface which allows entry into said secure data storage area, a user may perform the one or other input action, gesture or other step, wherein these are linked with a specific file or object. For example, while viewing a list of files (notes) in a note taking app on his/her smart phone, a user may typically tap on a first file to open it, and swipe to one side to delete it, as is known in the art. The present invention teaches that by, for example, when swiping to the other side a user may be presented with an interface where a password may be entered. If the password is correct, the user may be presented with access to a second file or a secure data storage area. In other words, said password may have been linked earlier to said first file. The secure data storage area may be a single file, a single folder, a list of files, a list of folders or any other relevant collection. The present invention is not limited in this. Files in said secure data storage area may be encrypted using any of the methods and technologies known to the art of cryptography. What is paramount is that a user interfaces with a singular first file, object or entity stored on his/her smart phone in a specific, predetermined manner, whereupon a PIN or password interface is presented, allowing entry into a secure data storage area if the correct PIN or password is provided, wherein files or objects stored in said secure data storage area are encrypted. If the password is incorrect, no action is taken, or the user enters the unprotected first file or note he/she is working with. This may be a valid working file that has no security requirements or purely a decoy note.

The user may be allowed to either link a possible secure file to every normal or unprotected file or to link a folder with secure files to a single, unprotected first file. Clearly different gestures may be chosen for the various functions. Said user may also link a specific password with a specific first file or object, wherein said link and password may be encrypted using any of the methods and techniques known in the field of cryptography, for example using public and private keys.

According to a further embodiment, the secure data storage application may execute in the background, without being visible during normal operation of said smart phone, and allow password protected access to said secure data storage area via interfacing in a specific, predetermined manner with any file or object stored on the smart phone, irrespective of the application required to open them. In another embodiment, the presently disclosed method for a secure data storage application may form part of the operating system of the smart phone, and not be a distinct application. Encryption methods and technologies as known in the art of cryptography may be used to encrypt files or objects stored in said secure data storage area, and to decrypt files or objects retrieved from said area.

In yet another embodiment, a user may automatically save any file or object to said secure data storage area by interfacing in a predetermined manner with said file or object, without having to enter a PIN or password, or accessing a secure data storage app. For example, while viewing a text document in a word processing app, a user may pinch, tap, pinch on the open document, or on an icon representing the document in a list, and the document will automatically be saved to said secure data storage area. To retrieve it, the user needs to access said secure data storage area by interfacing with an unprotected file or object as described above, and enter the correct PIN or password, wherein the unprotected file or object is not stored in the secure data storage area, and wherein said PIN or password may have been linked earlier to said unprotected file.

The present invention further teaches that the secure data storage app may be integrated into a normal app for a smart phone, or other mobile computing device. For example, a note taking app may inherently contain the above disclosed method for secure data storage. This may allow users to securely store note files from within the note app, and also to retrieve them. Further, it may be possible to securely store and retrieve files or objects from other apps, without having to open the note taking app, using the previously described method, according to the present invention. Even if the use of such a note taking app with integrated secure data storage becomes widespread, illicit users of said smart phone will not be able to determine whether sensitive data is stored or not, without severe effort. If the gesture or interaction required to access the PIN code or password interface is standardised, illicit users may perform it for a specific note file, but this will not provide any indication whether data is securely stored on not. Further, the present invention teaches that the gesture or interaction required to obtain said PIN code or password interface may be set by the user of said smart phone or other mobile device. This may add another layer of security, and make it very difficult to discern whether data is securely stored using said note taking app. It is to be understood that the reference to said note taking app is purely exemplary, and should not be construed as limiting to the presently disclosed invention, with the teachings of the present invention applicable to a wide range of smart phone, or other mobile computing device, apps.

In an embodiment, an app with integrated secure data storage functionality as disclosed may have a standard virtual button or icon associated with each file or object. If a user clicks on this button or icon for a first file or object, a PIN or password interface may be presented. When the correct PIN or password is entered, a secure data storage area is entered, which may consist of only one file, as an example. If the first file or object has not been linked with a secure data storage area, no response may be given when a PIN or password is entered. If an incorrect PIN or password is entered, where said first file or object has been linked with a secure data storage area, no response may also be given or access is given to the unprotected file. In this manner, it may be quite difficult to determine whether any secure data storage areas has been utilised on the smart phone, unless the correct PIN or password is used. Naturally, said PIN or password may have been linked previously to said first file or object. Further, files or objects stored in said secure data storage area may be encrypted with any of the method, techniques and technologies known in the art of cryptography. In addition, said PIN or password, and said links may also be encrypted thus.

It is proposed that the number of attempts to type in various passwords be limited even for files with no protected layer below it. For example only x attempts are allowed in y minutes and all the attempts are recorded in the secure file, so that when the secure file is opened with the correct password or PIN the user can be alerted to the attempts and the details thereof such as time and specific passwords tried.

In another embodiment of the present invention, a user may select the files or objects which allow access to said secure data storage area after performing the correct gesture, or another interaction, and supplying the correct PIN or password. This may be limited to a single file or object on said smart phone, or to a specific number, for example only three files. Further, the present invention teaches that a number of secure data storage areas may be utilized, with entry into each via interaction with separate files or objects, or utilizing distinct PIN's or passwords, or both. Using the note taking app as an example again, a user may elect to have three separate secure data storage areas, and these may be accessed after performing a specific gesture on or for a note file, and supplying three distinct passwords. Or each secure data storage area may be accessed by performing three distinct gestures, and using the same password. Or each of the three secure data storage areas may be accessed via a gesture or interaction with three distinct files, using three distinct passwords. It is clear that a large number of options and combination exist, and all of these should be considered part of this disclosure. The present invention teaches that more than one secure data storage area may be accessed on a smart phone, or other mobile computing device, using the methods taught by the present invention. This addresses prior art limitations, where a compromised password or PIN may provide access to all securely stored data.

To avoid abuse of a secure data storage app which embodies the present invention, it is further taught that a complementary consent app may be installed on said smart phone, or other mobile computing device. According to the present invention the consent app will only install on a smart phone which has been cleared of all apps and data, in other words on a clean phone. Once the consent app is installed and active, a specific PIN or password may be required to allow installation of a secure data storage app as disclosed in the previous sections. This may assist parents to ensure that their children do not abuse the presently disclosed secure data storage app to hide material not suitable for under aged viewing on their phones, for example. If the complementary consent app is installed on a child's phone, he/she may still install a secure data storage app as disclosed, to protect their sensitive data, for example financial records or passwords, but they do need the consent of the parent, who is required to enter a PIN or password to allow said installation. Or a complementary consent app may be used by employers, where workers have company smart phones, and the employer needs to be able to ensure that only allowable sensitive data is stored on said phones.

In a related embodiment, the complementary consent app may be installed on a smart phone irrespective of what apps are already installed, or what data is stored. However, once installed, it may control future additions or access to the data protection system or it may determine whether a complementary data protection storage app, as disclosed earlier, is present on said phone. If such a secure data storage app is present, the consent app may instruct it to automatically delete all securely stored data and to uninstall. To re-install the secure data storage app, a specific PIN or password may be required, enabling, for example, parental control. The present invention further teaches that said complementary consent app may run in the background, without being visible in a normal view of apps installed on the phone, to avoid disclosing the possible presence of securely stored data to illicit users of said smart phone, or other mobile computing device. Or it may be a general parental control app, visible in the normal listing of apps, which monitors and controls internet browsing, uses the GPS of the smart phone to locate children, limits the time spent playing games, limits phone call duration to ensure lower exposure to cell phone radiation, and so forth. If the consent app is integrated into such a parental control app, illicit users of the phone will not easily be able to determine whether a secure data storage app is also installed, according to the present invention.

BRIEF DESCRIPTION OF THE DRAWINGS

The invention is further described by way of examples with reference to the accompanying drawings which are briefly described as follows.

In FIG. 1A an app called IQ-Notes is shown on the screen of the smart phone in which a list of note files is presented, each of which has an associated/linked unmarked virtual button. If a user's finger engages a button corresponding to a particular file that has been linked to a secure data storage area as shown in FIG. 1B, the user will be presented with an interface which allows a password or PIN to be entered with a touch keyboard as shown in FIG. 1C. If the password is correct, the user may be presented with the contents of the secure data storage area, as shown in FIG. 1D.

In FIG. 4A, a screen view of the smart phone running the IQ-Notes app is shown in which three unsecured note files are listed that may be opened by a user tap on or near the icon for each. FIG. 4B graphically depicts a user swiping to one side on or near the icon for Note 3. In response and as shown in FIG. 4C, a password interface may be presented. If the user enters the correct password which has been associated with unsecured file Note 3, an app view which presents a single, secured file, and which has been linked to Note 3, may be presented to the user, as shown in FIG. 4D.

DESCRIPTION OF PREFERRED EMBODIMENTS

Figure 1A:
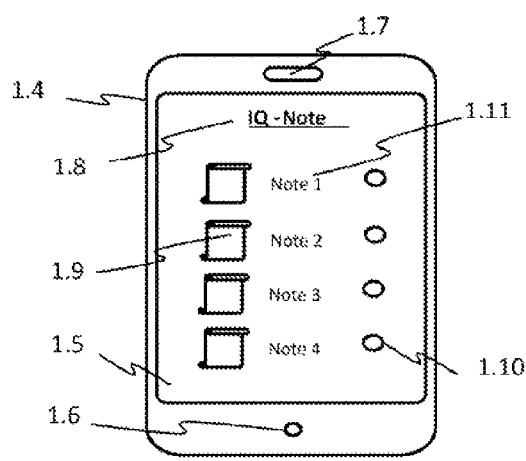
FIGS. 1A-1D depict different screen views of a smart phone that is configured to implement an exemplary embodiment of the present invention in a note app with integrated secure data storage ability.
Figure 1B:
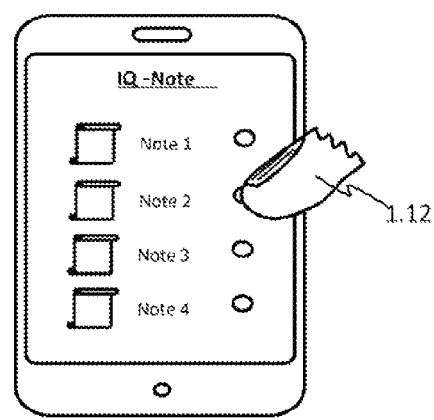
Figure 1C:
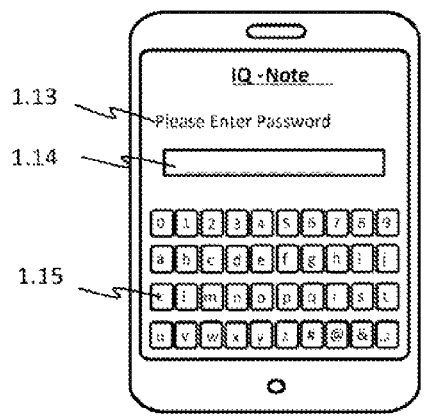
Figure 1D:
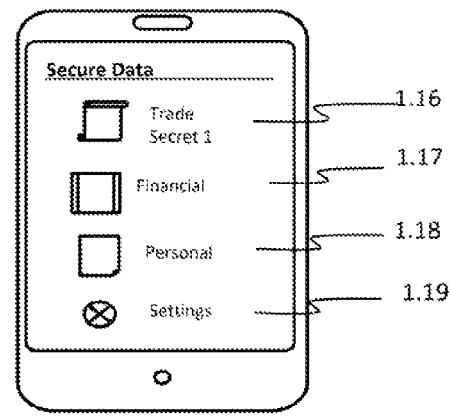

FIGS. 1A-1D present an exemplary embodiment of the present invention in a smart phone. In FIG. 1A a smart phone (1.4) is shown, with a touch screen (1.5), a speaker (1.7) and a microphone (1.6). An app called IQ-Notes running on said phone, as shown at (1.8), is ostensibly a note taking app. However, as per the teachings of the present invention, the app also has novel secure data storage capabilities, as will be explained. In FIG. 1A, a list of note files is presented, namely Note 1 to Note 4. Each has an icon, as shown at (1.9) and a name, as shown at (1.11). In addition, each file has an associated/linked unmarked virtual button, as shown at (1.10). According to the present invention, if a particular file has been linked to the secure data storage area and functionality of the app, and a user's finger (1.12) engages said button, as shown in FIG. 1B, the user will be presented with an interface which allows a password or PIN to be entered, as shown in FIG. 1C. Said engagement is not specifically limited, according to the present invention. In the example shown, it may be a single tap. But it may also be a specific, multi-step gesture, for example. If the particular file has not been linked with the secure data storage area and functionality of the app, the present invention teaches that no response or indication may be given if said button is correctly engaged. This increases the amount of effort illicit users have to expend to determine if any sensitive data is securely stored on said phone. In FIG. 1C, a text string (1.13) is used to prompt the user to enter a password in area (1.14) using the touch keyboard (1.15). If the password is correct, the user may be presented with the contents of the secure data storage area, as shown in FIG. 1D, wherein said contents may be encrypted according to any of the methods, techniques and technologies known in the art of cryptography. This may be a single file, which may be automatically opened after said password is correctly entered, or it may be a collection of files, also from other applications, for example trade secrets (1.16), sensitive financial documents (1.17) and personal documents (1.18). In the example shown, the secure data storage area also includes a "Settings" virtual button (1.19), which may be used, for example, to select which files that are not stored in the secure area that may be used to gain entry to said area, that is to link files which are not stored in the secure area to a password or PIN which may be used to gain access to the secure area, to create additional secure areas, select whether an indication should be given when a password is incorrect, and so forth.

Figure 2:
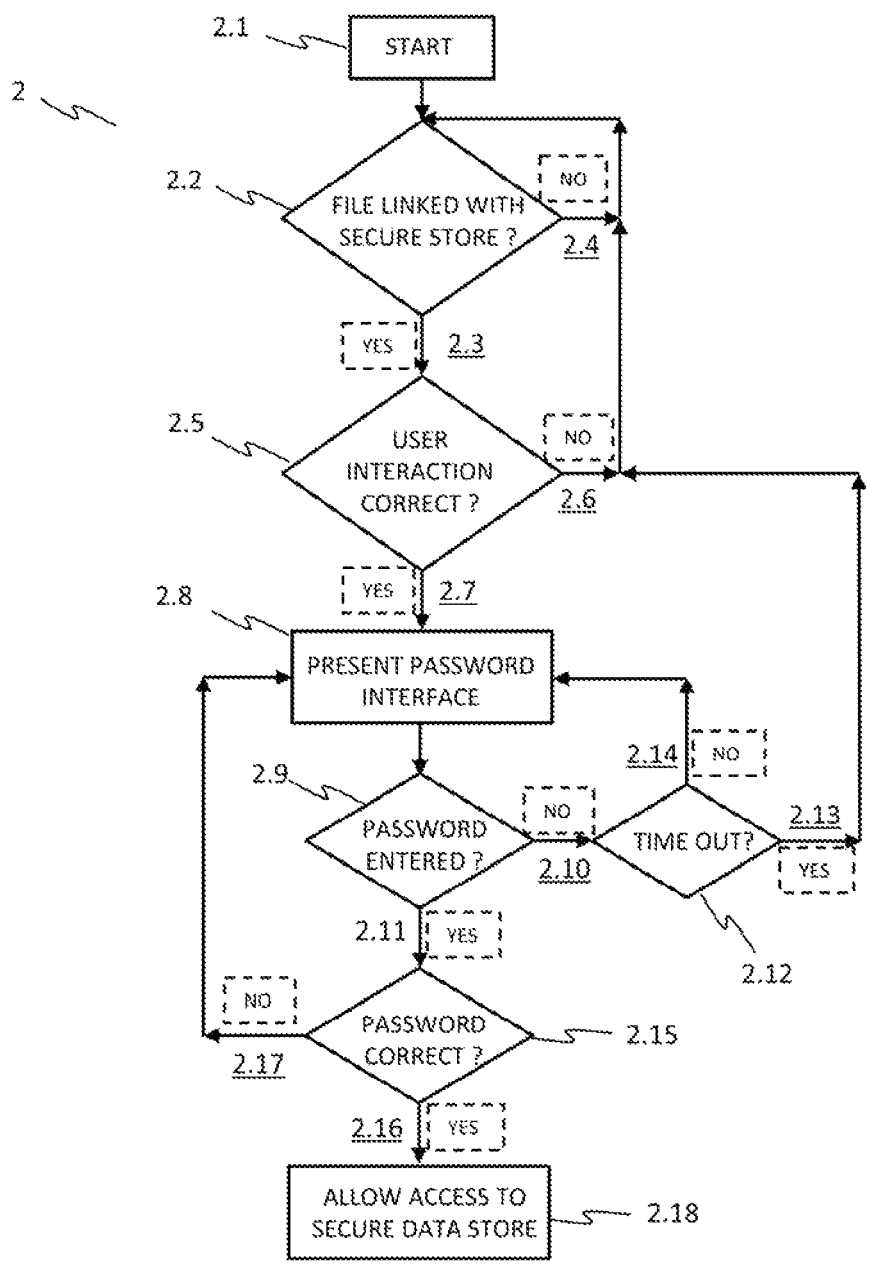
FIG. 2 shows an exemplary flowchart of a method to access a secure data storage area according to the present invention.

An exemplary flowchart of a method to implement access control for a secure data storage area on a smart phone, or other mobile computing device, is presented at (2) in FIG. 2. When a user interacts with a given file, for example making gestures on or in the vicinity of an icon representing said file, an authentication process is started (2.1). Firstly, the method checks whether the file has been linked with the secure data store, as at (2.2). If not, (2.4), the process returns to the start, typically without giving any response or indication to a user. An illicit user would therefore not receive an indication that a secure data store app is running on said phone until he/she engages the correct file or files, which may prove cumbersome. If the file has been linked with the secure data store, (2.3), the method checks whether the user interaction is correct, (2.5). If not, as at (2.6), the process again returns to the start. Once again, if no indication is given that the interaction was incorrect, it may positively frustrate the efforts of illicit users. If the user interaction is correct, (2.7), the password interface is presented, (2.8) prompting the user. If no password is entered, (2.10), a check is done, (2.12) to determine whether a timeout has occurred. If it did, (2.13), the process returns to the start. If time is still available, (2.14), the process returns to (2.8) and (2.9). If a password has been entered, (2.11), and it is correct, (2.16), access to the secure data store is granted, (2.18). If the password is incorrect, (2.15) to (2.17), the process returns to (2.8), typically without providing any indication. Naturally, said password may be linked beforehand by the user to said file, and the user may also link said file to said secure data storage area. The password may be linked with cryptographic techniques and methods, for example using public and private keys to encrypt for example the password, the links used and so forth.

Figure 3:
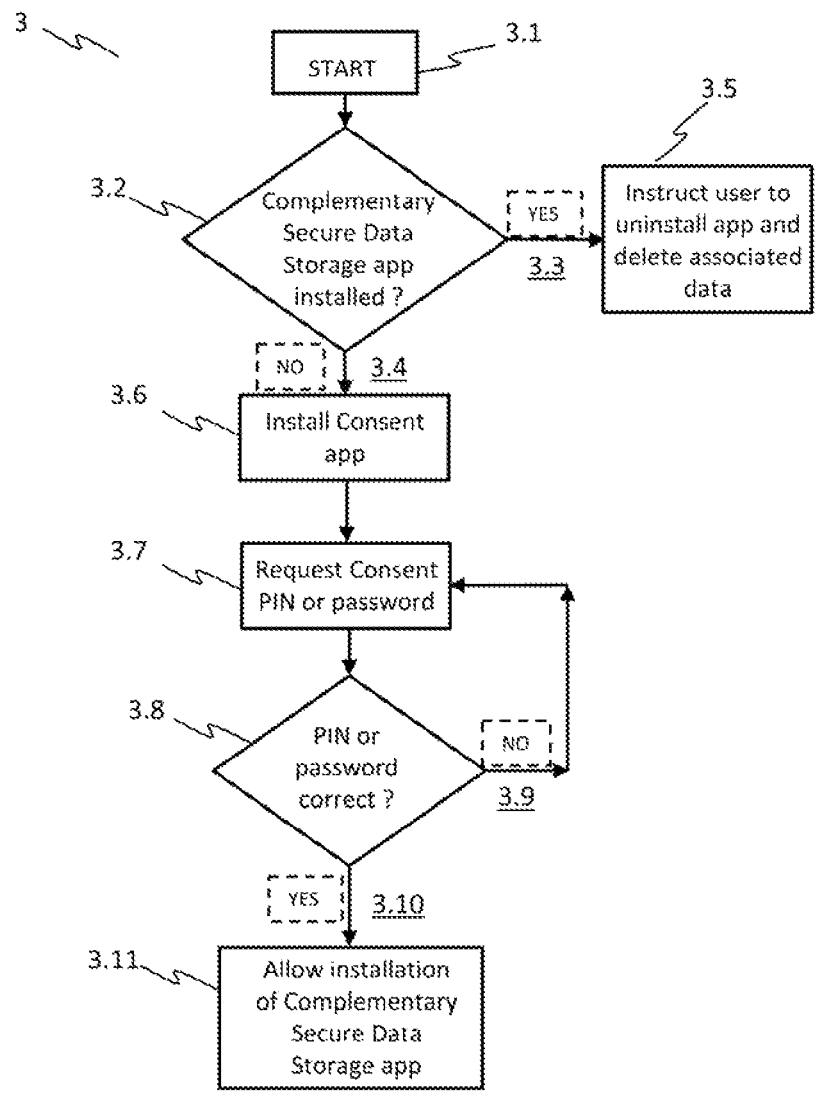
FIG. 3 shows an exemplary flowchart of a method to install a consent app according to the present invention.

As described earlier, the present invention also teaches use of a Consent app in complement to a Secure Data Storage app, as disclosed earlier, in an effort to prevent abuse of the Secure Data Storage app, particularly by under aged individuals. An exemplary method used during installation of such a Consent app is presented in the flow chart (3) in FIG. 3. After the installation process has started (3.1), the method checks whether the complementary Secure Data Storage app is installed, (3.2). If yes, (3.3), the user is instructed to uninstall the app, and delete associated files. If this is not done, the installation process for the Consent app will not progress past (3.2), according to the present invention. If the answer to (3.2) is no, as at (3.4), the Consent app is installed, (3.6). To install the complementary Secure Data Storage app of the present invention, a request for the Consent PIN or password is made (3.7), and once received, it is verified, (3.8). If it is not correct, (3.9), the process returns to the request. If it is correct, (3.10), installation of the complementary Secure Data Storage app, as per the teachings of the present invention, is allowed, (3.11). Said Consent PIN or password may make use of cryptographic techniques and methods to encrypt the stored value of said PIN or password which is used during verification of entered values. Such a Consent app may typically allow a user to access any of the data stored by the Secure Data Storage app, after furnishing the Consent password or PIN. Or it may simply operate in the background, and notify another smart phone, typically that of a parent or employer, wherever something is stored by said Secure Data Storage app, where said notification may be a simple time and date stamp, along with a file name, or a file description, or the origin of a file, for example a website.

Figure 4A:
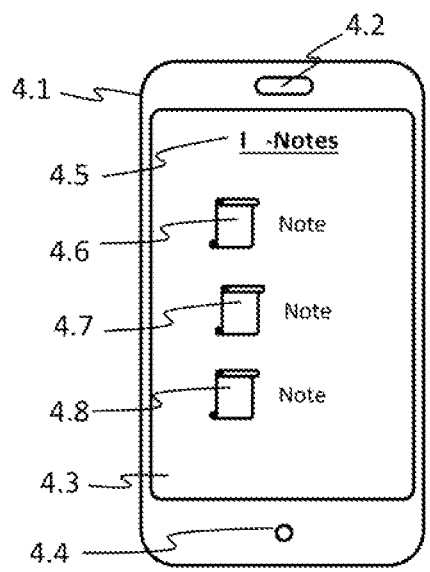
FIGS. 4A-4D depict different screen views of a smart phone that is configured to implement an exemplary embodiment of the present invention, where a specific unsecured note file is linked to a single protected file.
Figure 4B:
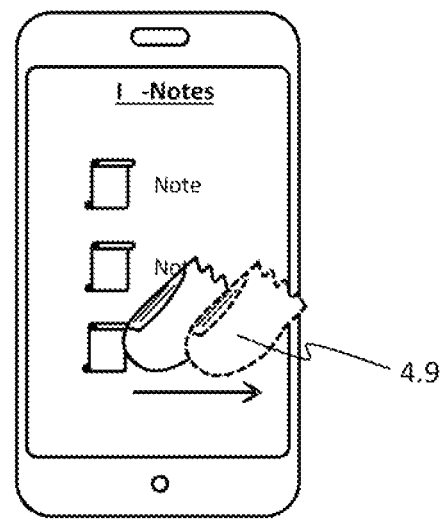
Figure 4C:
Figure 4D:
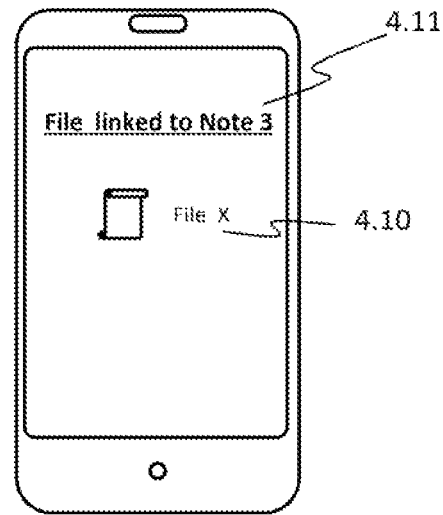

In FIGS. 4A-4D, a secure data storage app for a smart phone which embodies the present invention is illustrated. Smart phone (4.1) in FIG. 4A is typical of present phones, with a touch screen (4.3), a speaker (4.2) and a microphone (4.4). A note taking app called IQ-Notes is installed on said phone, as shown at (4.5). In the screen view of the app shown at (4.a), three unsecured note files are listed at (4.6), (4.7) and (4.8). These may be opened by a user tap on or near the icon for each, for example. However, if a user swipes to one side on or near the icon for one of these files, as shown by (4.9) in FIG. 4B, for example for the file named Note 3, a password interface may be presented, as shown in FIG. 4C. If the user enters the correct password which has been associated with unsecured file Note 3, an app view which presents a single, secured file, and which has been linked to Note 3, may be presented to the user, as shown by (4.10) and (4.11) in FIG. 4D. The user may then, for example, tap or click on this file, named File X in the example, to open it.

The invention claimed is:

1. A method for an application which executes on a mobile device, wherein the application has a plurality of distinct, displayed unmarked icons or buttons, each linked with an unprotected file or object stored and selectively linked with a hidden secure file or secure data storage area in a memory of said mobile device, and wherein the method comprises the steps of, in response to a user making a specific gesture on or in a vicinity of one of said icons or buttons, presenting the user with an interface for entering a predetermined password, and wherein correct entry of said password results in the step of opening or displaying said selectively linked hidden file or secure data storage area, located in the memory of said mobile device, and wherein if said secure data storage area contains one or more encrypted files or objects, said files or objects are decrypted and opened when selected from said display of said secure data storage area.

2. The method of claim 1, wherein incorrect entry of said password results in the step of said mobile device opening or displaying a file or object not stored in said secure area.

3. The method of claim 1, wherein said application is integrated into another application stored on and executed by said mobile device.

4. The method of claim 1, wherein if no hidden secure file or data storage area has been selectively linked to the icon, the entry of any password results in the step of said mobile device opening the unprotected file or object linked to the icon.

5. The method of claim 1, wherein incorrect entry of said password results in the step of said mobile device opening the unprotected file or object linked to said icon or button even when a secure file or data storage area is linked to the icon.

6. The method of claim 1, wherein said secure data storage area comprise a single encrypted file, and wherein correct entry of said password results in automatic decryption and opening of said single encrypted file.

7. The method of claim 1, wherein incorrect entry of said passwords results in the step of said mobile device opening or displaying a decoy file or object.

8. The method of claim 1, wherein said application executes in background, and is not visible or accessible via an operating system of said mobile device.

* * * * *